United States Patent [19]
Day et al.

[11] Patent Number: 5,956,437
[45] Date of Patent: Sep. 21, 1999

[54] ELECTRICALLY CONTROLLABLE OPTICAL ATTENUATOR

[75] Inventors: Stephen Day, Harlow; Terry Victor Clapp, Standon, both of United Kingdom

[73] Assignee: Northern Telecom Limited, Montreal, Canada

[21] Appl. No.: 08/997,752

[22] Filed: Dec. 24, 1997

[51] Int. Cl.[6] ........................... G02F 1/035
[52] U.S. Cl. ........................... 385/2
[58] Field of Search ............... 385/14, 12, 2–5; 359/140, 187, 192; 372/31, 26, 38; 356/345, 233

[56] References Cited

U.S. PATENT DOCUMENTS

| | | | |
|---|---|---|---|
| 3,634,695 | 1/1972 | Barringer | 359/230 |
| 5,085,501 | 2/1992 | Sakuma | 356/375 |
| 5,323,406 | 6/1994 | Yee | 372/26 |
| 5,535,001 | 7/1996 | Tajima | 385/12 |
| 5,572,350 | 11/1996 | Spanke | 359/140 |
| 5,771,255 | 6/1998 | Horichi et al. | 372/31 |

FOREIGN PATENT DOCUMENTS

| | | |
|---|---|---|
| 2 174 505 | 11/1986 | United Kingdom . |
| 2 187 858 | 9/1987 | United Kingdom . |

*Primary Examiner*—Akm E. Ullah
*Attorney, Agent, or Firm*—Lee, Mann, Smith, McWilliams, Sweeney & Ohlson

[57] ABSTRACT

A known form of electrically controlled optical attenuator is formed by a mach Zehnder waveguide configuration with a variable refractive index element in one arm to modify the undulatory spectral characteristic of the network to give a specific attenuation at a specific wavelength. The spectral characteristic of the network makes the attenuation that it provides wavelength dependent. An attenuator with a wavelength dependence of reduced magnitude is provided by the series combination of two Mach Zehnder networks, one having an electrically controllable optical path length adjuster in its longer interference arm, and the other with its adjuster in its shorter arm.

3 Claims, 12 Drawing Sheets

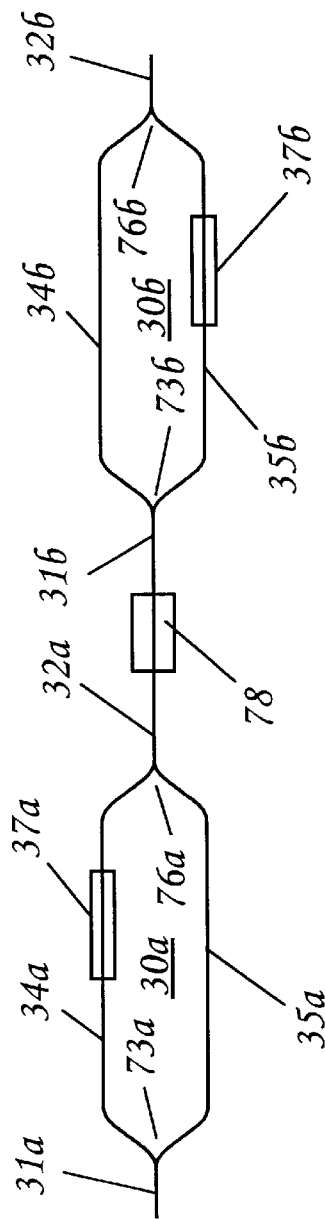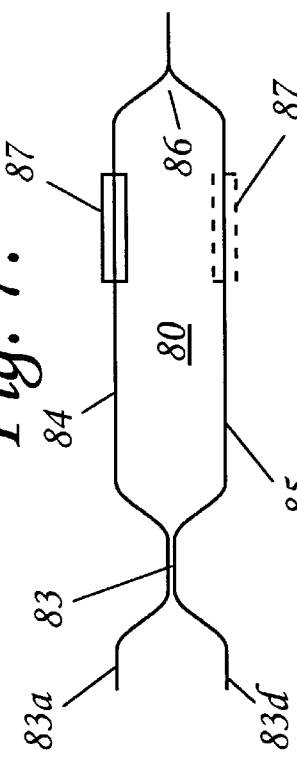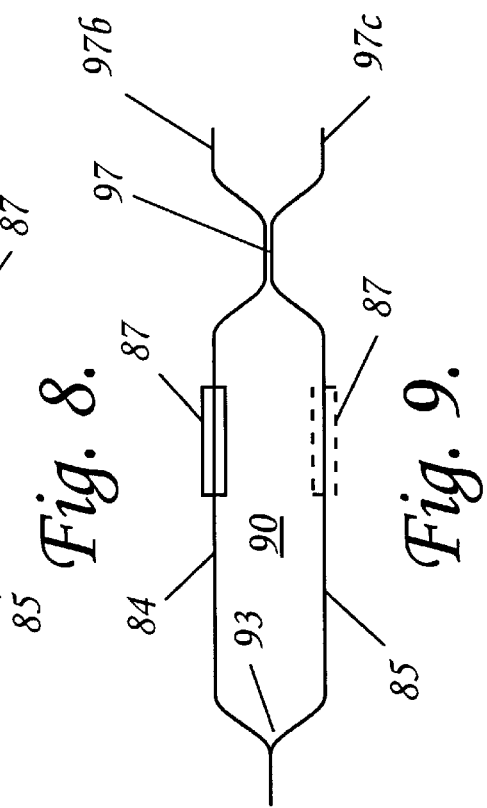
Fig. 7.
Fig. 8.
Fig. 9.

ELECTRICALLY CONTROLLABLE OPTICAL ATTENUATOR

BACKGROUND OF THE INVENTION

The specification of UK Patent Application GB 2 187 858 A describes an electrically controllable variable optical power ratio single mode optical fibre branching element constituted by a tandem arrangement of two 4-port 3 dB fused fibre couplers in Mach Zehnder configuration. Such a device is depicted schematically in FIG. 1 in which a first 4-port 3 dB single mode fused fibre coupler 10 with ports 10a, 10b, 10c and 10d, and a coupling region 10e, is optically coupled by means of two lengths 12 and 13 of single mode fibre with a second 4-port 3 dB single mode fused fibre coupler 11 having ports 11a, 11b, 11c and 11d, and a coupling region 11e. The lengths 12 and 13 of single mode optical fibre, which extend respectively between ports 10b and 11a, and between ports 10c and 11d, constitute the two interference arms of the Mach Zehnder configuration. Accordingly, if the optical path lengths of these interference arms 12 and 13 are equal, then all light launched into port 10a of the configuration emerges from port 11c, and similarly all light launched into port 10d emerges from port 11b. (The optical path length of any stretch of waveguide in which light propagates is the product of its physical length with the effective refractive index of light propagating in the guide.) If the two arms are of unequal optical path length, then the light that is launched into port 10a is shared between ports 11b and 11c in a ratio determined by the difference in phase introduced by the difference in optical path length. For any given wavelength, increasing the optical path length difference will cause the proportion of the light reaching port 11c from port 10a to vary according to a raised cosine characteristic. If the power from port 10a that emerges by way of port 11b is absorbed or otherwise disposed of, the optical coupling between port 10a and port 11b can be viewed in terms of the configuration acting as an optical attenuator. By the introduction into one of the interference arms of some form of electrically biased optical path length adjuster 14, the coupling between port 10a and port 11b can now be viewed in terms of the configuration acting as an electrically controllable optical attenuator. In the case of the specific configuration described in GB 2 187 858 A, the adjuster is an electrostrictive adjuster which changes the optical path length by physical stretching of one of the interference arm fibres.

Since the value of attenuation provided by the device is determined by the phase difference introduced by the difference in optical path length of the two interference arms, the value of attenuation provided by the configuration is inevitably wavelength dependent. For some applications this wavelength dependence may be small enough to be acceptable, while for others it may be too large. In respect of a configuration with equal optical path length interference arms under zero bias conditions, FIG. 2 shows calculated variations in attenuation over the (free-space) wavelength range 1530 nm to 1560 nm for different amounts of optical path length imbalance by a localised raising, by heating, of the effective refractive index of a 1 mm portion length in one of the interference arms. This figure shows that over this wavelength range the spectral variation in attenuation is proportionately quite small for attenuation of up to about 5 dB, but for attenuations of about 15 dB or more the spectral variation in attenuation has become much more significant.

SUMMARY OF THE INVENTION

An object of the present invention is to provide an electrically controllable optical attenuator exhibiting reduced wavelength sensitivity in comparison with that exhibited by the Mach Zehnder type configuration attenuator for instance as described in GB 2 187 858 A.

This objective is achievable by the use of a tandem arrangement of two Mach Zehnder configurations, both of which have unequal optical path length interference arms under zero bias conditions. By arranging for the optical path length adjuster of one Mach Zehnder configuration to be located in the shorter interference arm, while that of the other is located in the longer arm, it is possible to offset, at least partially, the wavelength sensitivity of one configuration by that of the other, even though both adjusters operate in the same sense (i.e. both adjusters only operate to increase the optical path length, or both only operate to decrease it).

Other features and advantages of the invention will be readily apparent from the following description of preferred embodiments of the invention, the drawings of the claims.

BRIEF DESCRIPTION OF THE DRAWINGS

FIG. 7 depicts a schematic representation of an attenuator embodying the present invention in a second form, FIGS. 8 and 9 depict schematic representations of alternative forms of hybrid Mach Zehnder configurations.

DETAILED DESCRIPTION OF THE PREFERRED EMBODIMENTS

Figure 3:
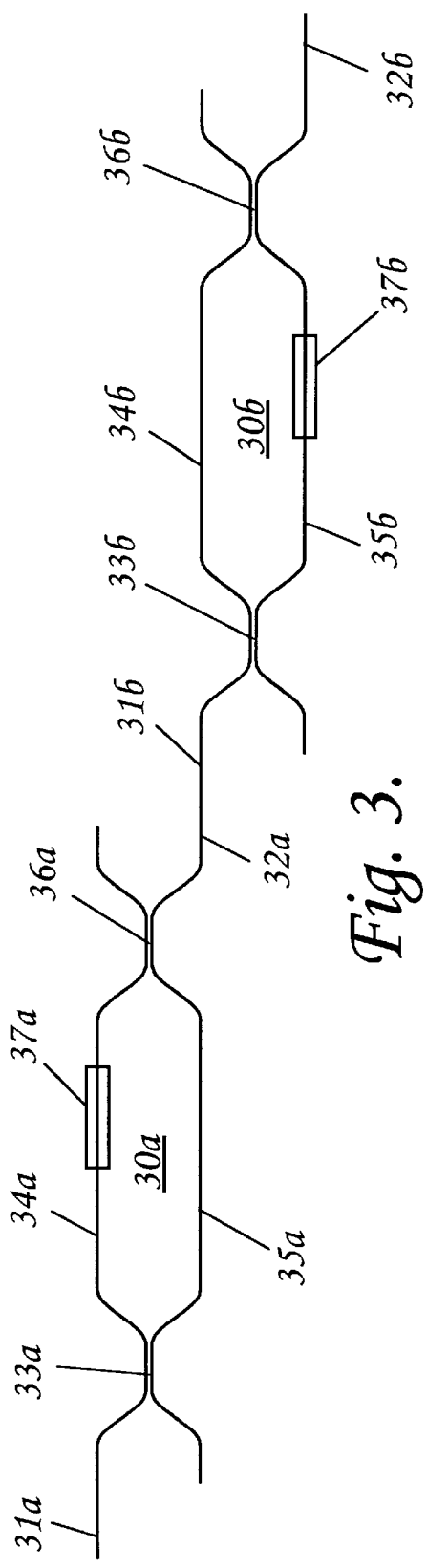
FIG. 3 depicts a schematic representation of an attenuator embodying the present invention in a first form.

Referring to FIG. 3, a first form of attenuator embodying the present invention comprises two Mach Zehnder configuration optical waveguide networks 30a, 30b connected optically in tandem. Each of these networks has an input waveguide 31a, 31b optically coupled with and output waveguide 32a, 32b by the series combination of a first 4-port 3 dB coupler 33a, 33b, two interference arm waveguides 34a, 35a, 34b, 35b optically in parallel, and a second 4-port 3 dB coupler 36a, 36b. Interference arm 34a is longer than interference arm 35a. Similarly interference arm 34b is longer than interference arm 35b. An electrically controllable lengthening optical path length adjuster 37a is located in the longer interference arm 34a of network 30a, and a similar adjuster 37b is located in the shorter interference arm 35b of network 30b.

Figure 1:
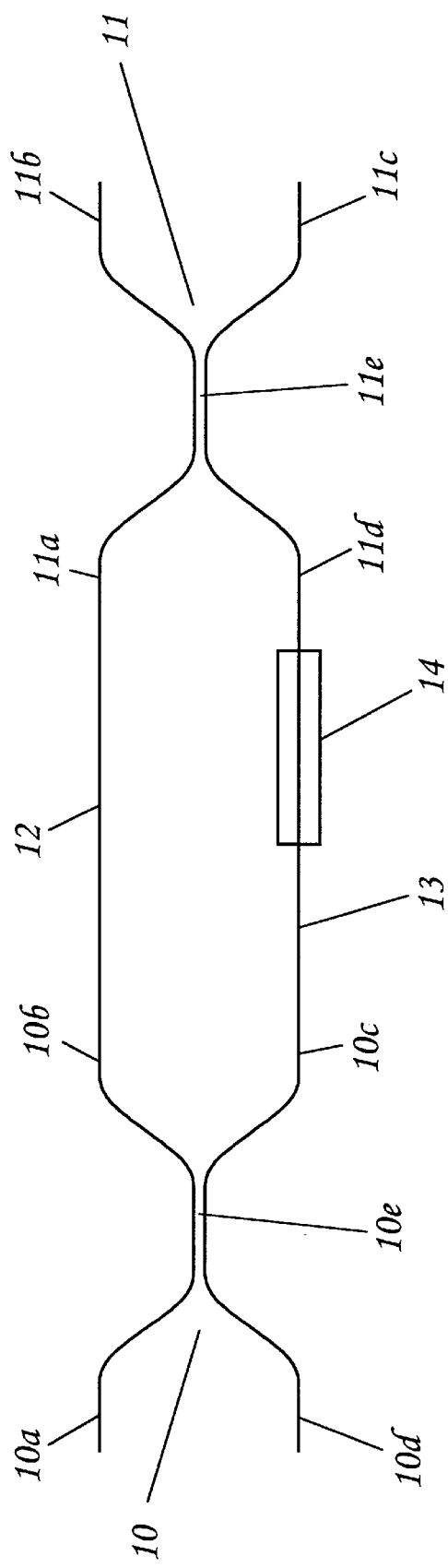
FIGS. 1 and 2 (to which previous reference has been made) respectively depict a schematic representation of a prior art Mach Zehnder configuration of optical attenuator, and the calculated spectral characteristics of a particular example of such an attenuator.

The relative optical path lengths of interference arms 34a and 35a are such that, under zero bias conditions of the adjuster 37a, provides the interference condition at the second 3 dB coupler 36a produces substantially 100% coupling between input and output waveguides 31b and 32b. A 4-port 3 dB coupler divides light launched into one of its ports into two equal amplitude components. Thus, referring to the coupler 10 of FIG. 1, light launched into its port 10a is divided by its coupling region 10e into two components emerging from the coupling region respectively propagating in ports 10b and 10c. The component 10b may be termed the 'straight-through' component because it is propagating in the same waveguide as that in which the light was originally launched. Correspondingly, the other component may be termed the 'cross-over' component. It is a general physical property of such 4-port 3 dB couplers that the two components emerge from the coupling region with the cross-over component leading by $\pi/2$ the straight-through component. Therefore, in respect of each of the networks 30a and 30b, the requisite 100% coupling between input and output waveguide pertains when the optical path length difference between the two arms corresponds to a phase difference of $2n\pi$, where n is a positive integer. This is because in each instance the input and output waveguides do not form part of the same waveguide. On the other hand, had, in either instance, the output waveguide been coupled with the other port, then the input and output waveguides would have been part of the same waveguide, and hence the 100% coupling condition would have been provided by an interference arm optical path length difference corresponding to a phase difference of $(2n-1)\pi$.

Figure 2:
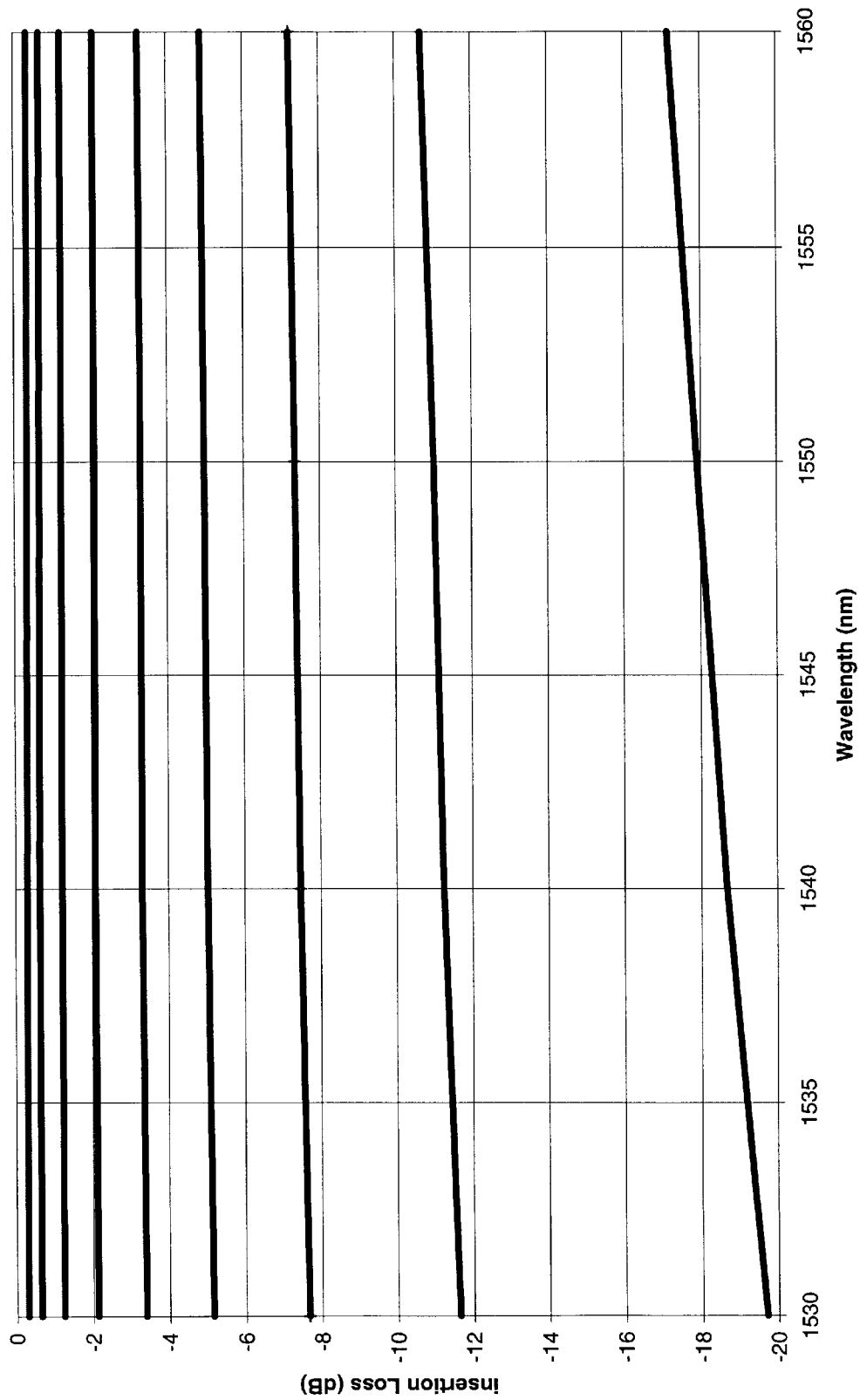
Figure 4:
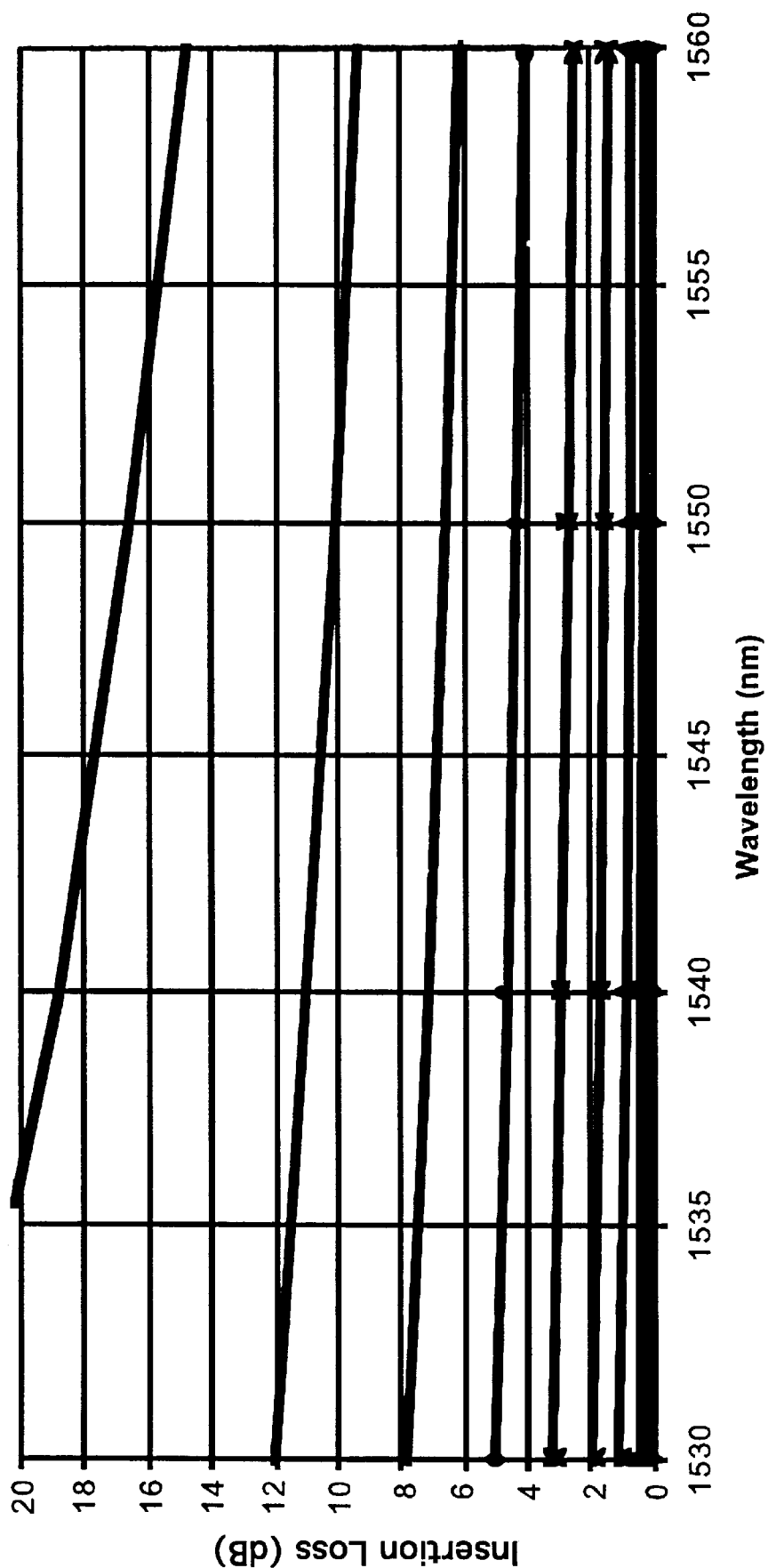
FIG. 4 depicts the calculated spectral characteristic of a particular example of Mach Zehnder configuration optical waveguide network having a lengthening optical path length adjuster in its longer interference arm.
Figure 5:
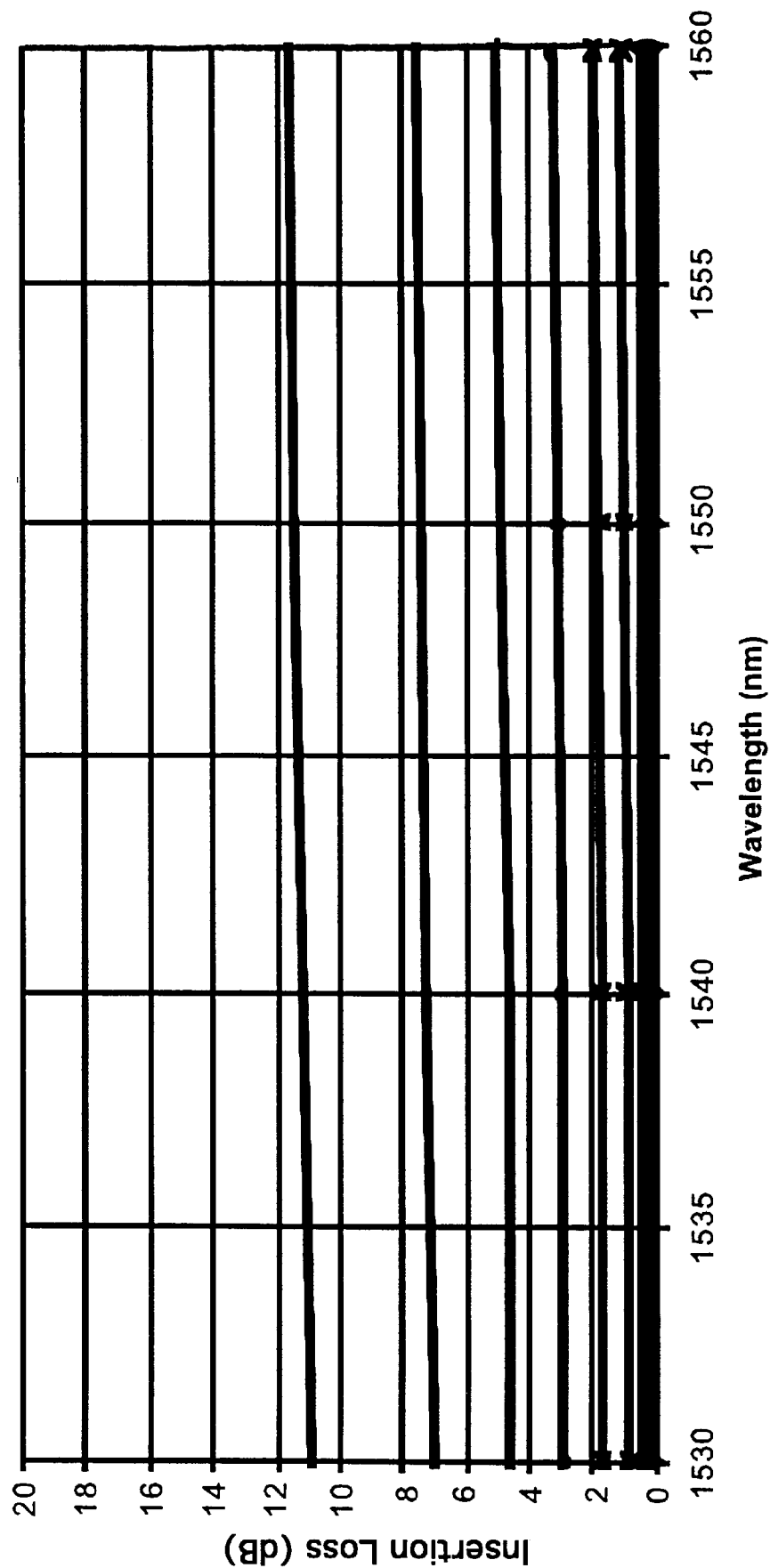
FIG. 5 depicts the calculated spectral characteristic of a particular example of Mach Zehnder configuration optical waveguide network having a lengthening optical path length adjuster in its shorter interference arm.

FIGS. 4 and 5 show, respectively in respect of networks 30a and 30b, calculated variations in attenuation over the (free-space) wavelength range 1530 nm to 1560 nm for different values of bias providing equal increments of optical path length imbalance. In each instance the interference arm optical path difference under zero bias conditions corresponds to a phase angle difference of $2\pi$ at 1545 nm (free-space wavelength). A comparison of FIGS. 2 and 4 shows that network 30a of FIG. 3 exhibits the same sort of wavelength sensitivity as the network of FIG. 1, but that the 30a network wavelength dependence is the stronger. A similar comparison of FIGS. 2, 4 and 5 shows that network 30b exhibits a wavelength sensitivity intermediate those of the network of FIG. 1 and network 30a of FIG. 3, but that the sign of that sensitivity is reversed (providing greater attenuation at the longer wavelengths instead of at the shorter wavelengths).

Therefore, in the tandem arrangement of FIG. 3 the wavelength sensitivity of one of the component networks 30a and 30b acts to offset the wavelength sensitivity of the other. By judicious weighting of the electrically engendered optical path differences the wavelength sensitivity of the tandem arrangement can be minimised. This weighting can for instance be achieved by making one of the adjusters 37a and 37b longer than its counterpart so that the same level of bias applied to both adjusters effects a greater phase difference in the interference arm with the longer adjuster than in the one with the shorter adjuster. An alternative weighting arrangement involves applying a proportionately greater bias to one adjuster than to the other. Such proportionality may for instance be achieved by use of a potential divider (not shown). When using a $2\pi$ phase difference under zero bias conditions in each of the networks 30a and 30b of FIG. 3, the greater wavelength sensitivity exhibited by network 30a means that the optimum weighting for minimum wavelength dependence exhibited by the tandem arrangement of both networks lies in the neighbourhood of the ratio 1 to 4. A more nearly even weighting ratio may be achieved by using different values of zero bias optical path length difference in the interference arms of the two networks 30a and 30b. By way of example, the length difference could provide a phase difference of $2\pi$ in network 30a and $4\pi$ in network 30b. Changing over the input or output waveguide connections of one of the networks 30a and 30b so that the 100% coupling is 'straight-through' instead of 'cross-over' enables the difference in phase difference between the two networks to be reduced from $2\pi$ to $\pi$. For instance, if network 30a remains a 'cross-over' network while network 30b is converted to a 'straight-through' network allows a phase difference of $2\pi$ to be employed in network 30a in conjunction with a phase difference of $3\pi$ employed in network 30b.

Figure 6:
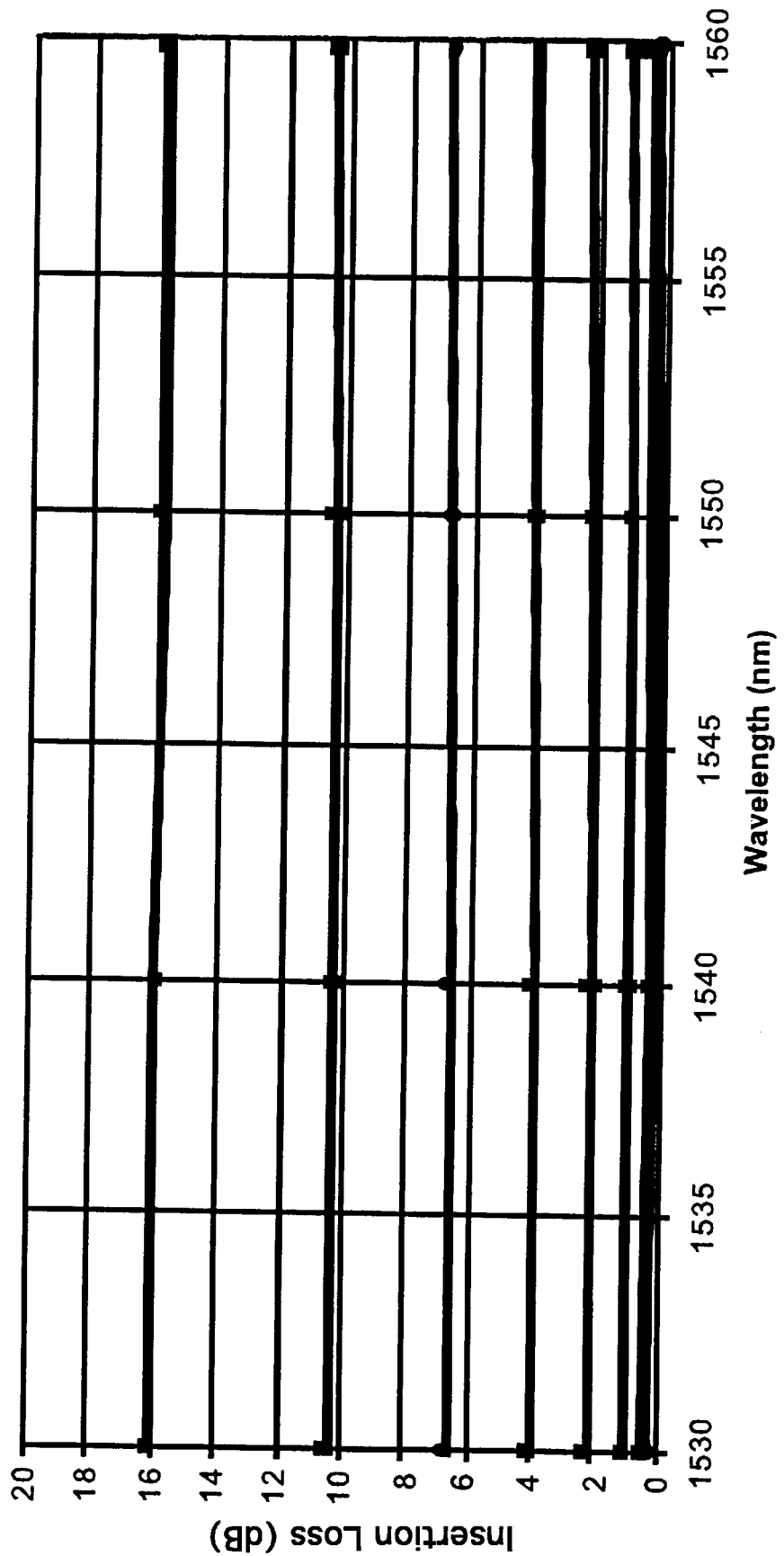
FIG. 6 depicts the calculated spectral characteristic of a particular example of attenuator as depicted in FIG. 3.

FIG. 6 shows in respect of the tandem arrangement of the two networks 30a and 30b the calculated variations in attenuation over the (free-space) wavelength range 1530 nm to 1560 nm for different values of near-optimised weighted bias (1 to 4 ratio) providing different amounts of optical path length imbalance when the zero bias phase difference (at 1545 nm) is $2\pi$ in both instances. It is to be particularly noted that the wavelength sensitivity of such a tandem arrangement is significantly reduced in comparison with that calculated for the single network of FIG. 1.

3-port 3 dB Y-couplers can be substituted for the 4-port 3 dB couplers of the tandem network arrangement of FIG. 3. FIG. 7 illustrates a tandem arrangement of networks 70a and 70b differing from those of FIG. 3 only in the replacement of first and second 4-port 3 dB couplers 33a, 33b and 36a, 36b respectively with first and second 3-port 3 dB Y-couplers 73a, 73b, 76a and 76b. With a 3 dB Y-coupler the power launched into the common arm is shared equally between the two branch arms, and there is no phase difference between the components launched into the two branch arms. Accordingly, for there to be 100% coupling between input waveguide 31a and output waveguide 32a, the optical path length difference between the two interference arms 34a and 35a should correspond to a phase angle of $2n\pi$. (The same relationship is also required for network 70b.) If the optical path length difference corresponds to a phase angle difference of $(2n-1)\pi$, then no optical power is launched into the single guided core mode of waveguide 32a. Instead power propagates in one or more higher order (unguided) modes. These will be naturally much more highly attenuated than the single guided core mode, but, if spacing between Y-couplers 76a and 71b is so small that this natural attenuation is insufficient, that attenuation may be augmented by the use of some form of cladding mode stripper 78.

As explained above, with the networks 30a and 30b of FIG. 3 that use 4-port 3 dB couplers, it is possible to arrange for 100% coupling between the input and output waveguides of a network to occur with an optical path length difference corresponding to a phase angle of $2n\pi$ or of $(2n-1)\pi$ according to whether the input and output waveguides are arranged in 'cross-over' configuration or 'straight-through' configuration. With the networks 70a and 70b there is only one possible configuration, and so the only phase angle option for 100% coupling is a phase angle of $2n\pi$. However different phase angle relationships for 100% coupling are provided by the hybrid Mach Zehnder networks 80 and 90 respectively of FIGS. 8 and 9, Network 80 of FIG. 8 is similar to that of network 30a or 30b of FIG. 3 according to whether the electrically controllable optical path length adjuster 87 is located in the longer interference arm 84, as shown in solid line, or in the shorter interference arm 85, as shown in broken line. It differs principally in that, though it retains one 4-port 3 dB coupler 86, the place of the other 4-port 3 dB coupler 33*a* has been taken by a 3 dB Y-coupler 83. The network 90 of FIG. 9 is identical with that of FIG. 8 except for the replacement of the 4-port and 3-port 3 dB couplers 83 and 86 respectively by 3-port and 4-port 3 dB couplers 93 and 96. In the case of the network 80, if the input is applied to port 83*a*, then the that onent in interference arm 85 leads that in interference arm 84 by $\pi/2$. Under these circumstances the zero bias 100% coupling condition is given when the optical path length of interference arm 84 is longer, under zero bias conditions, than that of interference arm 85 by an amount corresponding to the phase angle $(2n+\frac{1}{2})\pi$. Correspondingly, if the input is applied to port 83*d*, a phase angle of $(2n-\frac{1}{2})\pi$ provides the required coupling.

Figure 10:
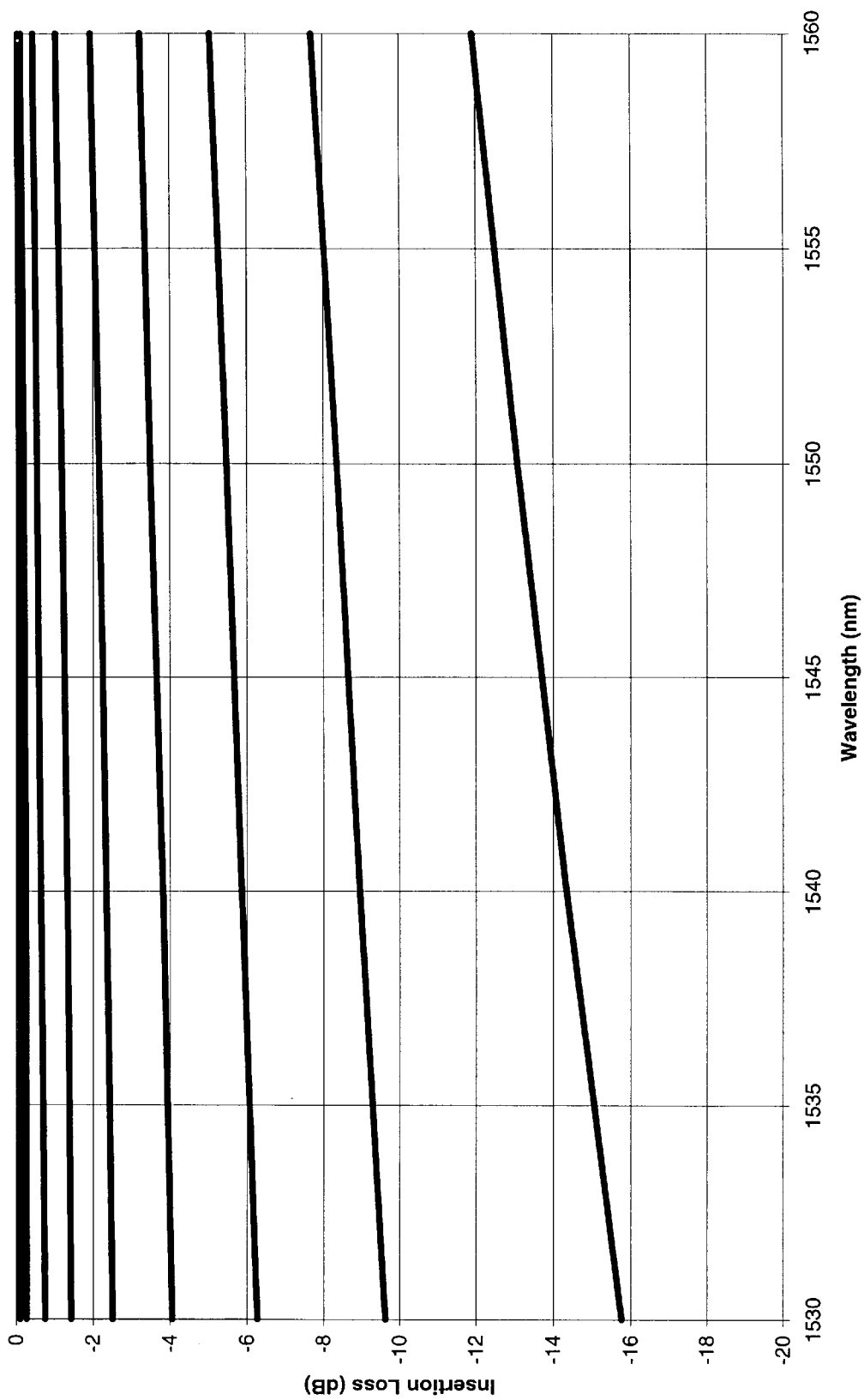
FIGS. 10 to 12 depict calculated spectral characteristics similar to those of FIGS. 4 to 6, but in respect of examples of Mach Zehnder configuration constructed using 3-port 3 dB Y-couplers instead of 4-port 3 dB couplers.
Figure 11:
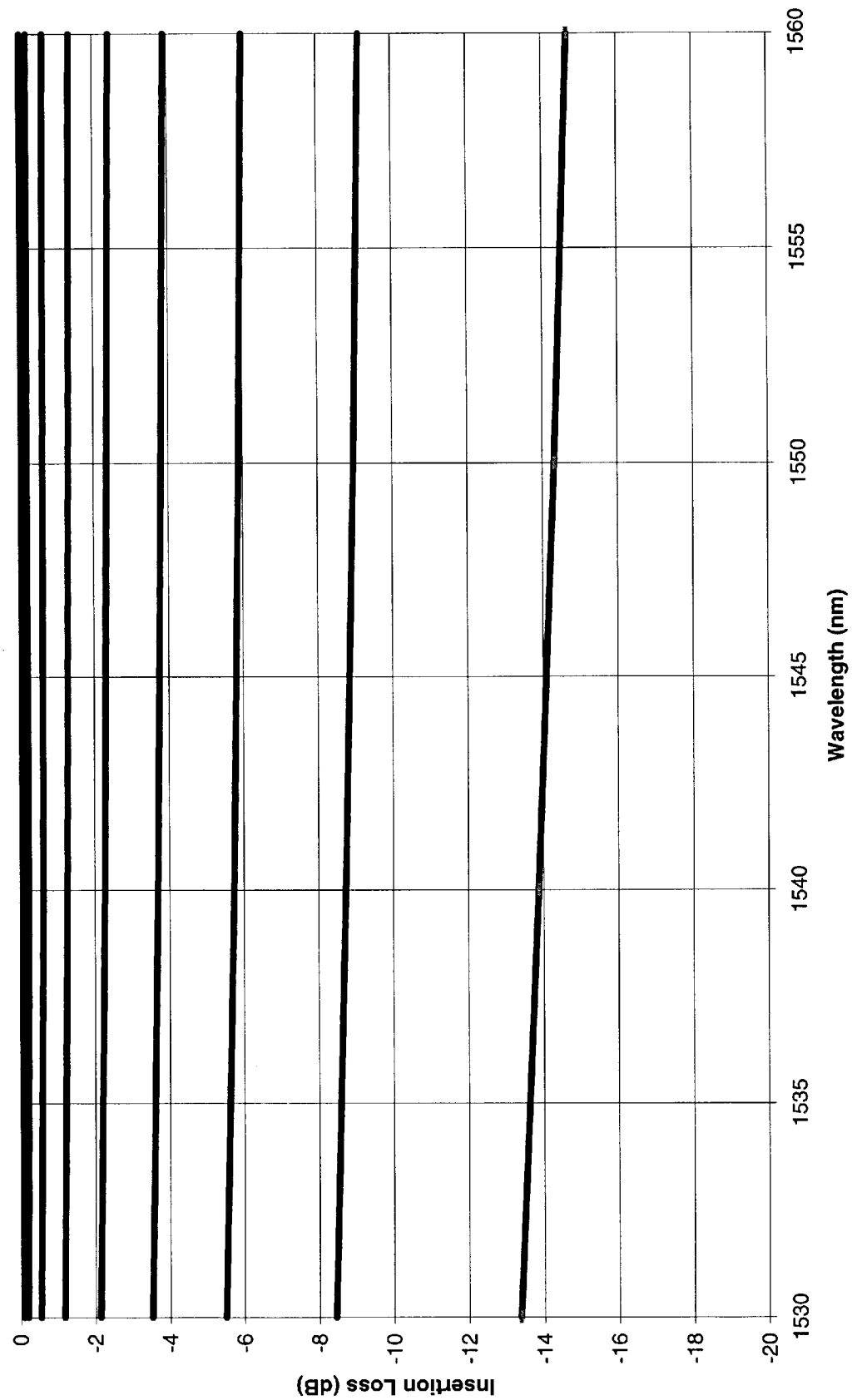
Figure 12:
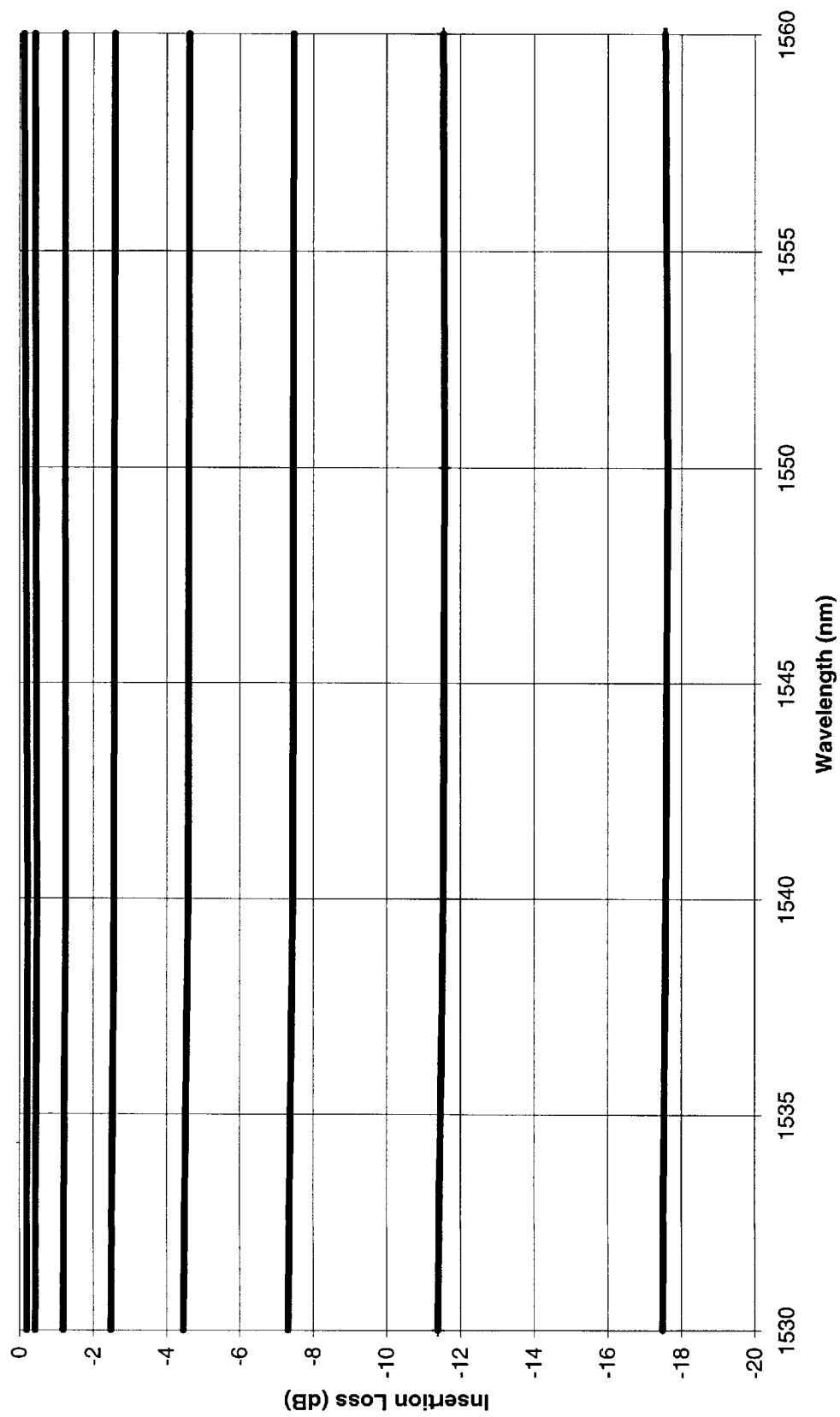
Figure 13:
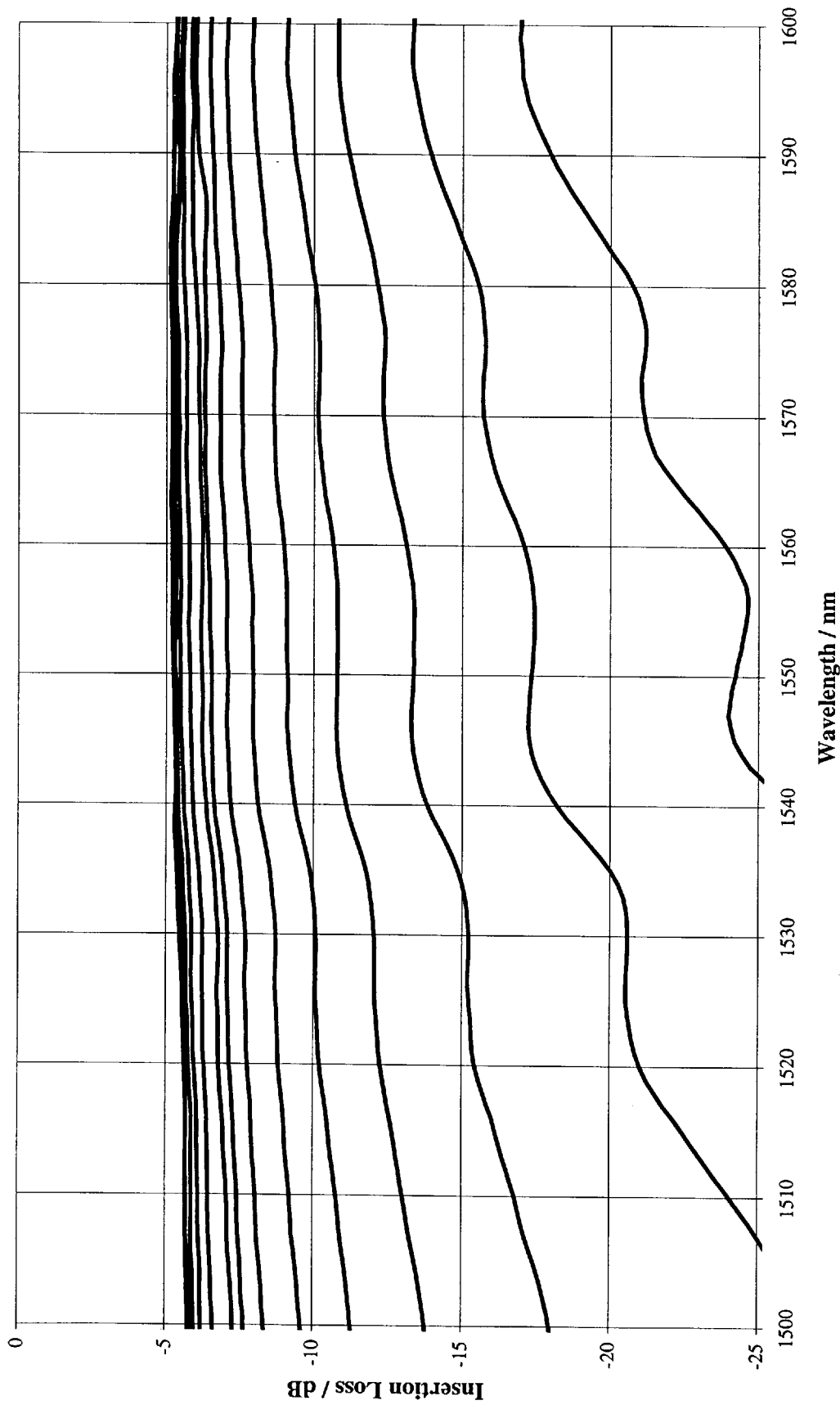
FIGS. 13 to 15 depict measured spectral characteristics corresponding to the calculated ones of FIGS. 10 to 12.
Figure 14:
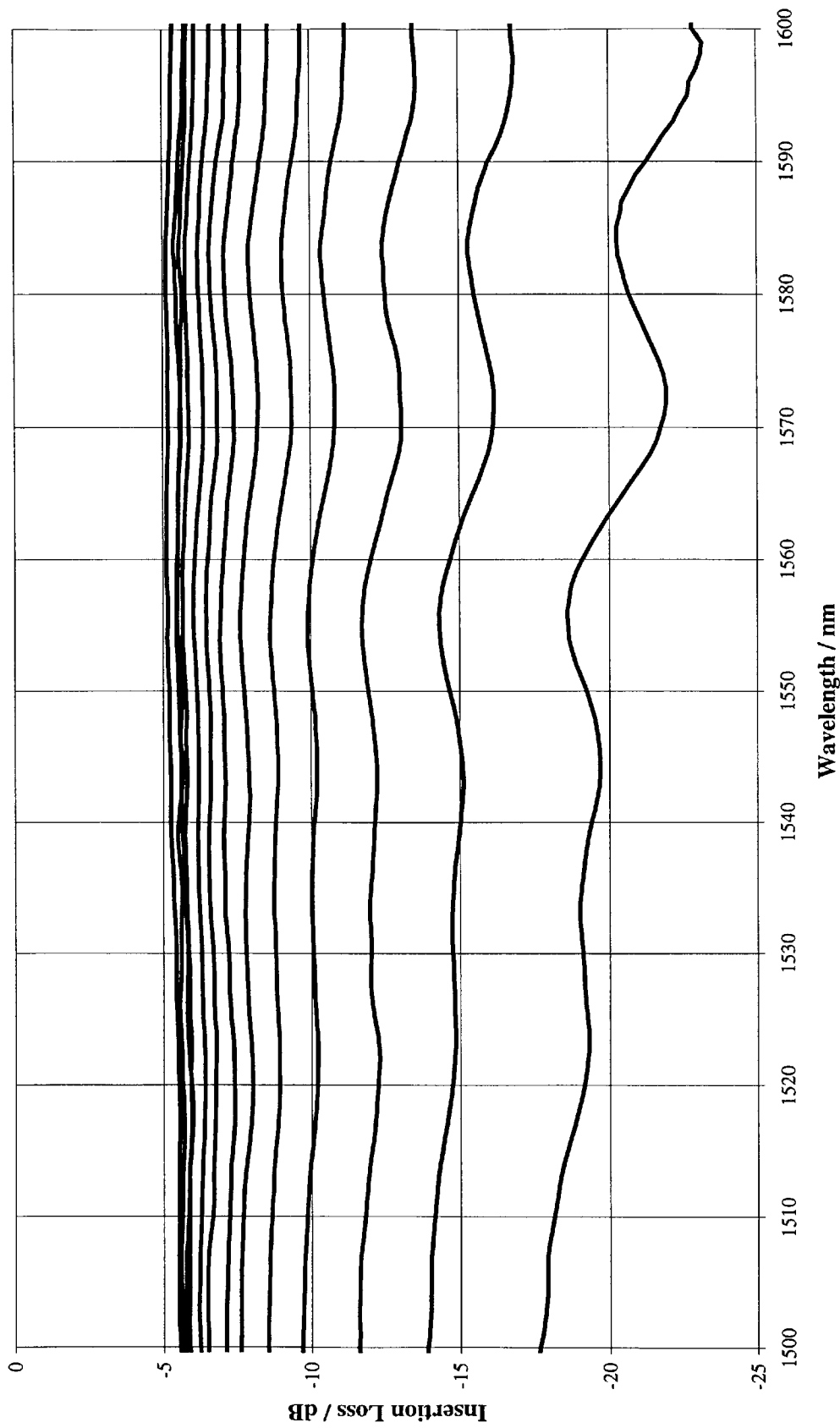
Figure 15:
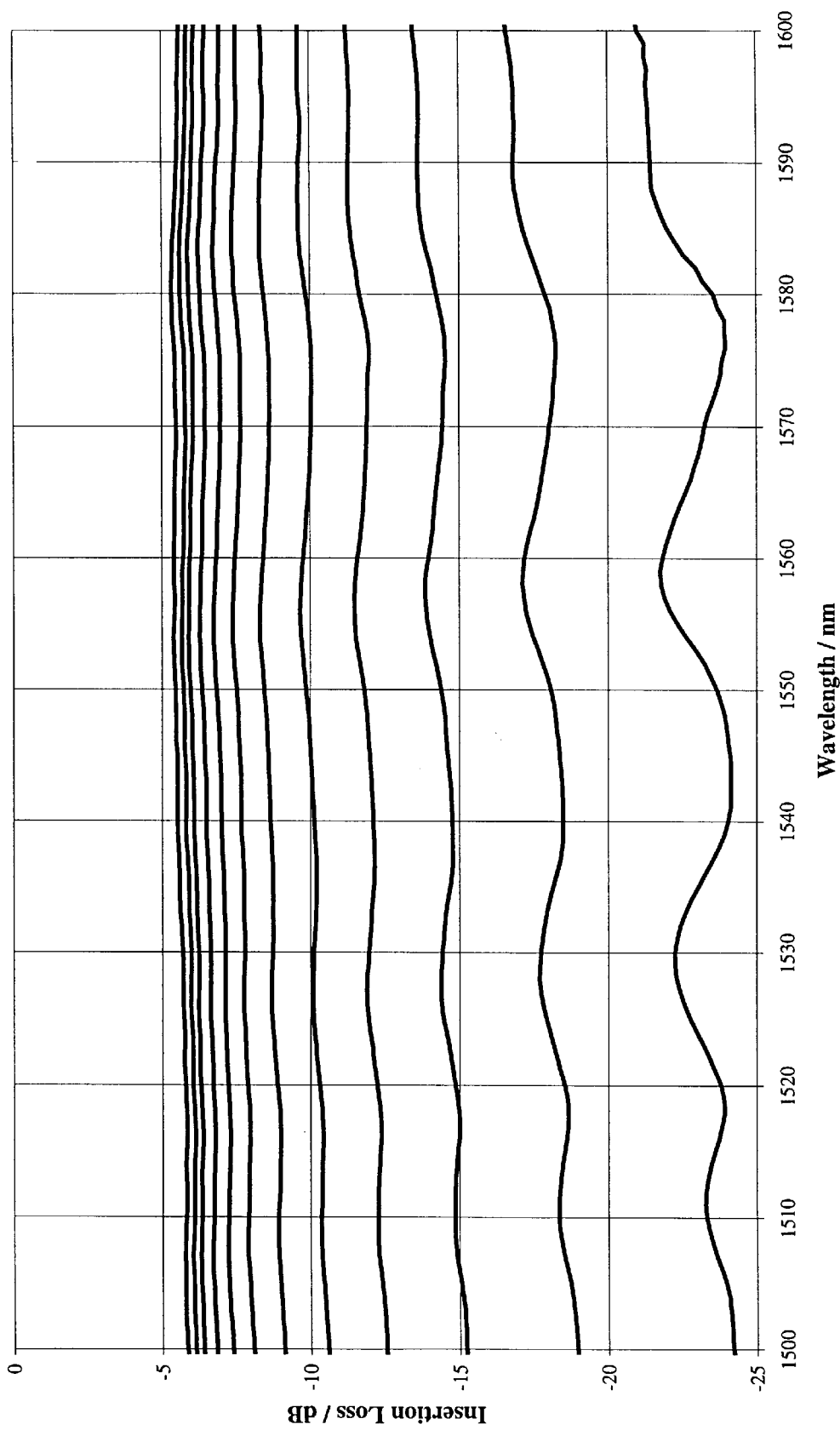

The modelling giving rise to the plots of FIGS. 4, 5 and 6 was repeated, but this time in respect of Mach Zehnder networks using 3-port Y-couplers, to give the plots of FIGS. 10, 11 and 12. Thus FIGS. 10 and 11 depict, for a set of different applied bias levels, the calculated wavelength dependencies in respect of the particular examples of 3-port 3 dB coupler type networks of FIG. 7, respectively networks 30*a* and 30*b*, having zero bias interference arm length differences each corresponding to a phase difference of $2\pi$. FIG. 12 similarly depicts the wavelength dependency in respect of the tandem arrangement of networks 30*a* and 30*b* operated with a weighting ratio of 1:3. These FIGS. 10 to 12 provide a basis for comparison with plots depicted in FIGS. 13 to 15 that were obtained from measurement made on practical embodiment of a FIG. 7 tandem arrangement of Y-coupler networks 30*a* and 30*b*, having zero bias interference arm length differences each corresponding to a phase difference of $2\pi$. In respect of FIGS. 12 and 15 the comparison is not a direct comparison to the extent that the weighting ratio for the FIG. 15 plots was 1:1. These Y-coupler type networks were integrated optics type channel waveguide structures fabricated using silica on silicon technology involving the deposition of a silica buffer layer on a planar silicon substrate, the deposition and then patterning of a core glass layer of doped silica on the buffer layer, and then the deposition of a cladding glass layer, also of doped silica. In each instance the deposition was by plasma enhanced chemical vapour deposition (PECVD). The core glass layer was made of germania doped silica with a doping concentration providing the material with a refractive index raised by $7\times10^{-3}$ above that of the buffer and cladding layer materials. The waveguides of the networks had a cross-sectional width of 6 $\mu$m and a cross-sectional height of sum. The bend radii of the S-bends of the Y-couplers was 30 mm, and the separation of the two interference arms of a network in the neighbourhood of an optical path length adjuster was 160 $\mu$m. Each adjuster was a Joule-effect heating element made by the patterning of a sputtered layer of chrome to provide individual heaters measuring 2 mm long and 12 $\mu$m wide.

We claim:

1. An electrically controllable optical attenuator having first and second Mach Zehnder configuration optical waveguide networks connected optically in series, wherein each Mach Zehnder network has an input waveguide optically coupled with an output waveguide by the series combination of a first 3 dB coupler, two interference arm waveguides optically in parallel, and a second 3 dB coupler, wherein one interference arm waveguide of each network is provided with an electrically biased optical path length adjuster, wherein, under zero bias conditions of the adjuster, the two interference arm waveguides of each Mach Zehnder network differ in optical path length by a non-zero amount providing an interference condition at the second 3 dB coupler of that Mach Zehnder network that gives substantially 100% optical coupling between its input and output waveguides, and wherein the adjusters are located respectively in the longer interference arm waveguide of one of the Mach Zehnder networks, and in the shorter interference arm waveguide of the other Mach Zehnder network.

2. An attenuator as claimed in claim 1, wherein said adjusters are constituted by electrical heating elements.

3. An adjuster as claimed in claim 1, wherein, in respect of each of said first and second networks, under zero bias conditions ot the adjuster of that network, the two interference arm waveguides of that network differ in optical path length by a non-zero amount providing a phase angle difference of $n\pi$, where n is a positive integer.

* * * * *